(12) United States Patent
Breitgand et al.

(10) Patent No.: US 7,489,639 B2
(45) Date of Patent: Feb. 10, 2009

(54) ROOT-CAUSE ANALYSIS OF NETWORK PERFORMANCE PROBLEMS

(75) Inventors: David Breitgand, Modi'in (IL); Ealan Henis, Rehovot (IL); Edya Ladan-Mozes, Tel-Aviv (IL); Onn Shehory, Neve Monosson (IL); Elena Yerushalmi, Herzeliya (IL)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 11/088,054

(22) Filed: Mar. 23, 2005

(65) Prior Publication Data
US 2006/0215564 A1    Sep. 28, 2006

(51) Int. Cl.
*G01R 31/08* (2006.01)
*H04J 1/16* (2006.01)
*H04L 12/16* (2006.01)
*G06F 15/173* (2006.01)

(52) U.S. Cl. .................. 370/241; 370/242; 709/224
(58) Field of Classification Search .......... 370/241, 370/242; 709/223–224; 714/1, 25, 48, 799
See application file for complete search history.

(56) References Cited

U.S. PATENT DOCUMENTS

| | | | |
|---|---|---|---|
| 5,084,870 A * | 1/1992 | Hutchison et al. ........... 370/258 |
| 5,583,860 A * | 12/1996 | Iwakawa et al. ............. 370/232 |
| 5,941,992 A * | 8/1999 | Croslin et al. ................. 714/4 |
| 6,636,981 B1 | 10/2003 | Barnett et al. |
| 6,691,256 B1 * | 2/2004 | Cook et al. .................... 714/43 |
| 7,275,103 B1 * | 9/2007 | Thrasher et al. .............. 709/224 |
| 2001/0008019 A1 * | 7/2001 | Vert et al. ....................... 714/1 |
| 2002/0083371 A1 | 6/2002 | Ramanathan et al. |
| 2002/0161875 A1 * | 10/2002 | Raymond ..................... 709/223 |
| 2003/0097438 A1 * | 5/2003 | Bearden et al. .............. 709/224 |
| 2004/0049563 A1 * | 3/2004 | Orcutt et al. ................. 709/223 |
| 2004/0103181 A1 | 5/2004 | Chambliss et al. |
| 2004/0111560 A1 * | 6/2004 | Takase et al. ................ 711/114 |
| 2004/0199627 A1 * | 10/2004 | Frietsch ....................... 709/224 |
| 2006/0047926 A1 * | 3/2006 | Zheng ......................... 711/162 |
| 2006/0092848 A1 * | 5/2006 | Matsuda ...................... 370/242 |

OTHER PUBLICATIONS

Kochut, A. et al., "Management Issues in Storage Area Networks: Detection and Isolation of Performance Problems", IFIP/IEEE Ninth International Network Operation and Management Symposium (NOMS '04, Seoul, Korea, Mar. 2004), pp. 593-604.

* cited by examiner

*Primary Examiner*—Kevin C. Harper
*Assistant Examiner*—Xavier Sze-Wai Wong
(74) *Attorney, Agent, or Firm*—Stephen C. Kaufman, Esq.; McGinn IP Law, PLLC

(57) ABSTRACT

A method for diagnosing network performance problems includes providing a graph representing a topology of a network including first nodes that are classified as providers of a resource, second nodes that are classified as consumers of the resource, and third nodes that are classified as mediators intervening between the providers and the consumers. Responsively to a report of a performance problem encountered by a given consumer in the network, at least one input/output (I/O) path is traced through the graph connecting the given consumer to one or more of the providers. One or more problematic nodes are identified along the at least one I/O path as possible causes of the performance problem.

9 Claims, 4 Drawing Sheets

ROOT-CAUSE ANALYSIS OF NETWORK PERFORMANCE PROBLEMS

FIELD OF THE INVENTION

The present invention relates generally to computer systems and networks, and specifically to diagnosis of performance problems in computer networks.

BACKGROUND OF THE INVENTION

A Storage Area Network (SAN) is a dedicated high-speed network connecting multiple storage servers (hosts) to multiple storage devices. The SAN model creates a pool of storage that can be shared by multiple consumers, consolidating heterogeneous storage resources across an enterprise. Communications within the SAN are typically optimized for carrying input/output (I/O) traffic between the storage servers and the storage devices and, possibly, among the storage devices themselves without intervention of the server. Application traffic is generally handled by a separate messaging network, such as a LAN or WAN.

Large SANs may include thousands of different inter-related logical and physical entities. When an application performance problem is detected and reported, either by the user of an application or by an automatic monitoring tool, the root cause of this performance problem can be anywhere in the system, including the SAN, LAN, storage server, database, application server, client machine, etc. Some currently-available management tools monitor the performance of individual components in the SAN and report to the system manager about deviations from the normative behavior, usually defined in terms of performance thresholds on the operational values of performance metrics of the components. For example, the IBM TotalStorage Productivity Center for Fabric (formerly known as the IBM Tivoli SAN Manager) provides functions such as automatic resource and topology discovery, monitoring and alerts, zone control and link-level error prediction capabilities. The system administrator, however, is expected to determine the relationships between the reported deviations (which may be scattered throughout the system) and the performance problems detected at the application level, based on his or her knowledge of the system. Although this approach may be feasible for small SANs, it becomes intractable as SAN size grows.

Preliminary attempts at developing automatic tools for finding the root cause of network performance problems have been described in the patent and technical literature. For example, U.S. Patent Application Publication US 2002/0083371 A1, whose disclosure is incorporated herein by reference, describes a method for monitoring performance of a network using topology information that identifies interconnections and interdependencies among network components. Based upon the topology information and various forms of mapping information, a user is able to navigate through a Web-based user interface to determine root causes of network problems.

U.S. Patent Application Publication US 2004/0103181 A1, whose disclosure is incorporated herein by reference, describes a performance manager and method based on a system model that includes measured entities representing the operational characteristics of the system components and relationships among the measured entities. The performance manager uses an interaction model to determine the most relevant entities in the system model affecting the system performance. An operator reviews the relevant entities and applies controls to selected entities to manage the overall system performance and to resolve problems affecting the components in the system.

Kochut et al. present a three-stage performance management algorithm in "Management Issues in Storage Area Networks: Detection and Isolation of Performance Problems," IFIP/IEEE Ninth International Network Operation and Management Symposium (NOMS '04, Seoul, Korea, March, 2004), pages 593-604, which is incorporated herein by reference. The authors extend the static dependency map of the SAN topology into the host server. The first step of the algorithm is to understand the baseline performance of the SAN as viewed from the logical volumes of the host. The system is then monitored continuously, and the monitoring data are parsed for performance degradation at the logical volume. The final step merges the identification of suspected volumes with the dependency map to isolate a subset of the SAN where contention may be occurring.

SUMMARY OF THE INVENTION

Embodiments of the present invention provide efficient methods and systems for diagnosing the root cause of network performance problems, and specifically I/O-related network problems. These methods and systems are particularly suited for networks that are dedicated to providing specific resources, such as providing storage resources in a SAN, in which communication channels are dedicated to I/O traffic. When a performance problem is reported by a consumer of a resource in such a network, such as an application running on a server, it is likely that the root cause of the problem can be found at some node along an I/O path connecting the consumer to a provider of the resource to this consumer, such as a storage logical unit located on a back-end disk controller. Therefore, embodiments of the present invention first locate the I/O paths within the network that serve the consumer in question, and then focus the search for problematic nodes along these paths. The inventors have found that this sort of "informed search" approach reduces substantially the computational burden of finding the root cause of network problems in comparison with search methods known in the art.

In the embodiments of the present invention that are described hereinbelow, the search for problematic nodes makes use of available information regarding the physical and logical configuration of the network in question. Based on this information, a performance analyzer constructs a graph representing the topology of the network. Upon receiving a report of a performance problem encountered by a given consumer, the performance analyzer traces the I/O paths through the graph that emanate from this consumer. These I/O paths connect one or more of the providers of the resources via intermediate nodes (referred to as "mediators") to the given consumer. Typically, the performance analyzer uses the logical topology of the network in order to focus only on those physical paths along which the consumer can actually access the providers, and thus eliminates paths in the graph that are logically not allowed.

The performance analyzer examines performance metrics at the nodes along the I/O paths that it has traced in order to identify the problematic nodes that may be responsible for the performance problem. A node is defined as problematic, for example, if one or more operational values pertaining to its relevant performance metrics violate pre-set thresholds. (Various techniques may be used for setting the thresholds, but these techniques are outside the scope of the present invention.) The performance analyzer identifies a set of one or more nodes that are with high probability the root cause of the observed performance problem (a candidate set). The final decision as to whether a specific node from this set is, indeed, a root cause node is typically left to the administrator.

Nodes that are not located along these I/O paths emanating from the consumer in question are not considered in the initial stage. Thus, the size of the search set that must be examined by the performance analyzer is typically much smaller than the search field of methods of performance analysis that are known in the art. Optionally, if the root cause of the performance problem is not considered to have been found within the candidate set along the I/O paths from the provider to the consumer, the performance analyzer traces additional I/O paths that cross these original I/O paths at the candidate set nodes, and searches for additional problematic nodes along the crossing paths. If the root cause is not identified at this stage, the performance analyzer may perform an exhaustive search on all remaining cross paths that cross the consumer-provider I/O paths.

There is therefore provided, in accordance with an embodiment of the present invention, a method for diagnosing network performance problems, the method including:

providing a graph representing a topology of a network including first nodes that are classified as providers of a resource, second nodes that are classified as consumers of the resource, and third nodes that are classified as mediators intervening between the providers and the consumers;

receiving a report of a performance problem encountered by a given consumer in the network;

responsively to the report, tracing at least one input/output (I/O) path through the graph connecting the given consumer to one or more of the providers; and identifying one or more problematic nodes along the at least one I/O path as possible causes of the performance problem.

In an aspect of the invention, providing the graph includes identifying physical and logical links between the nodes, and tracing the at least one I/O path includes building the at least one I/O path in accordance with the logical links. Typically, identifying the logical links includes providing a logical mapping between the nodes, and building the at least one I/O path includes eliminating from the path the physical links that do not correspond to the logical mapping.

In one embodiment, providing the graph includes grouping a plurality of the nodes together into a super-node having an internal node structure, and tracing the at least one I/O path includes tracing the at least one I/O path through the super-node without reference to the internal node structure.

In disclosed embodiments, the network includes a storage area network (SAN), and the resource includes at least one of a storage capacity and a bandwidth. Typically, the first nodes include storage servers having logical volumes associated therewith, and receiving the report includes receiving an indication of at least one of a capacity problem and a throughput problem in one of the logical volumes. Additionally or alternatively, the first nodes have logical volumes associated therewith, and the second nodes include storage devices having logical units associated therewith, and tracing the at least one I/O path includes extending the at least one I/O path from one of the logical volumes to one or more of the logical units.

In some embodiments, tracing the at least one I/O path includes building a directed acyclic graph (DAG) within the topology of the network from the given consumer to the providers that are coupled by the topology to provide the resource to the given consumer.

Typically, identifying the one or more problematic nodes includes monitoring performance metrics of the nodes in the network, and identifying a given node as problematic if one or more of the performance metrics of the given node are outside a predefined bound.

In a disclosed embodiment, the method includes tracing a further I/O path through the graph connecting another consumer to the providers and crossing the at least one I/O path at one of the problematic nodes, and identifying one or more further problematic nodes along the further I/O path as a possible cause of the performance problem. Typically, tracing the further I/O path includes initiating the tracing of the further I/O path upon determining that the one or more problematic nodes identified along the at least one I/O path are not the causes of the performance problem.

There is also provided, in accordance with an embodiment of the present invention, apparatus for diagnosing network performance problems, the apparatus including:

a memory, which is arranged to store a graph representing a topology of a network including first nodes that are classified as providers of a resource, second nodes that are classified as consumers of the resource, and third nodes that are classified as mediators intervening between the providers and the consumers; and a processor, which is arranged to receive a report of a performance problem encountered by a given consumer in the network, and to trace, responsively to the report, at least one input/output (I/O) path through the graph connecting the given consumer to one or more of the providers and to identify one or more problematic nodes along the at least one I/O path as possible causes of the performance problem.

There is additionally provided, in accordance with an embodiment of the present invention, a computer software product for diagnosing network performance problems, the product including a computer-readable medium in which program instructions are stored, which instructions, when read by a computer, cause the computer to provide a graph representing a topology of a network including first nodes that are classified as providers of a resource, second nodes that are classified as consumers of the resource, and third nodes that are classified as mediators intervening between the providers and the consumers, and further cause the computer, upon receiving a report of a performance problem encountered by a given consumer in the network, to trace, responsively to the report, at least one input/output (I/O) path through the graph connecting the given consumer to one or more of the providers and to identify one or more problematic nodes along the at least one I/O path as possible causes of the performance problem.

The present invention will be more fully understood from the following detailed description of the embodiments thereof, taken together with the drawings in which:

DETAILED DESCRIPTION OF EMBODIMENTS

Figure 1:
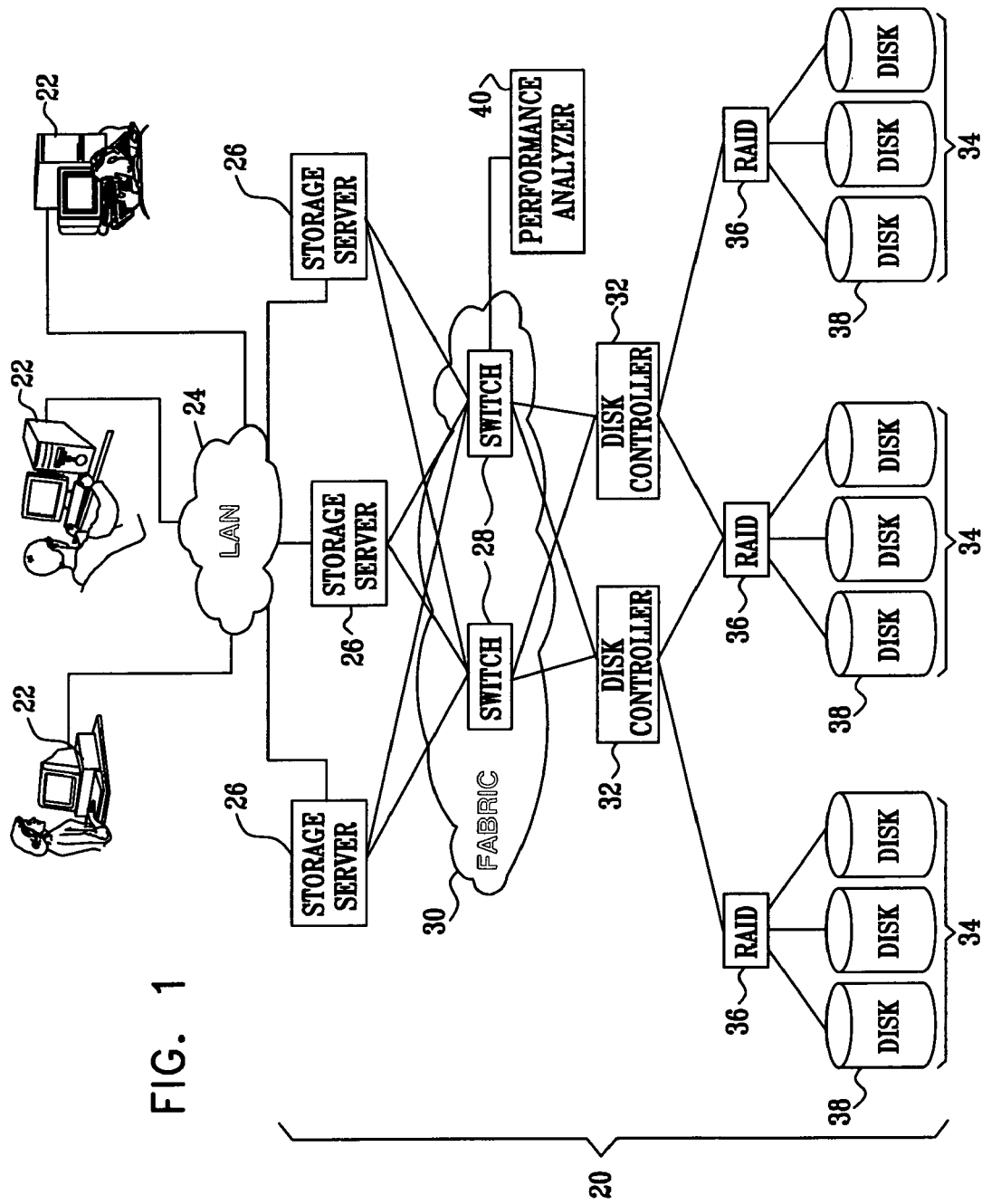
FIG. 1 is a block diagram that schematically illustrates a SAN monitored by a performance analyzer, in accordance with an embodiment of the present invention.

FIG. 1 is a block diagram that schematically illustrates a storage area network (SAN) 20 with a performance analyzer 40, in accordance with an embodiment of the present invention. The SAN is optimized for carrying only I/O traffic between storage servers 26 and storage devices 34, and possibly among the storage devices themselves. Application traffic to and from clients 22 is carried by a separate messaging network 24, such as a local area network (LAN) or wide area network (WAN).

Typically, storage servers 26 communicate with storage devices 34 in SAN 20 via one or more switches 28, which are commonly arranged as a switching fabric 30. Access to storage devices 34 is carried out through disk controllers 32, such as the IBM Shark™ controller. The storage devices themselves may comprise substantially any type (or multiple types) of storage media, such as magnetic disks or tape or optical media. For the sake of simplicity in the present example, the storage devices are assumed to comprise disks 38 in a RAID (redundant array of independent disks) configuration, with a RAID controller 36 connected to each disk array. The connections between the elements of SAN 20 may be made via any suitable type of communication media and protocols known in the art, though Fibre Channel technology is most commonly used in currently-available high-performance SANs.

Although for the sake of simplicity, SAN 20 is shown in FIG. 1 as including only a small number of nodes, large SANs may include thousands of different interrelated logical and physical entities. Furthermore, although the types of physical entities that are illustrated in FIG. 1 and the overall configuration of these entities are characteristic of many SANs that are currently in use, these features of SAN 20 are shown only by way of illustration. The principles of the present invention are applicable (and in fact, are most advantageous) in SANs of larger size, as well as in I/O networks of other types, and are not limited in application to any particular choice of network components or configuration.

When an application performance problem is detected and reported either by an application user (such as one of clients 22) or by automatic monitoring, the problem is reported to performance analyzer 40. The performance analyzer uses network configuration information and performance metrics, as described in detail hereinbelow, to identify entities in the SAN that are likely to be the root cause of the specific performance problem in question. These entities are referred to hereinbelow as "problematic entities" or "problematic nodes."

Typically, performance analyzer 40 comprises a general-purpose computer, which is programmed in software to carry out the functions described hereinbelow. The software for this purpose may be downloaded to the computer in electronic form, over a network, for example, or it may alternatively be provided on tangible media, such as magnetic, optical or electronic storage media. The computer has suitable interfaces for communicating with SAN 20 to receive the network configuration and performance information necessary to carry out the functions of performance analyzer 40. Although the performance analyzer is shown in FIG. 1 as a standalone unit, which is coupled directly to fabric 30, the performance analyzer may alternatively be coupled to SAN 20 at a different point, and its functions may also be integrated into another, existing computer, such as one of servers 26 or a management station (not shown).

Figure 2:
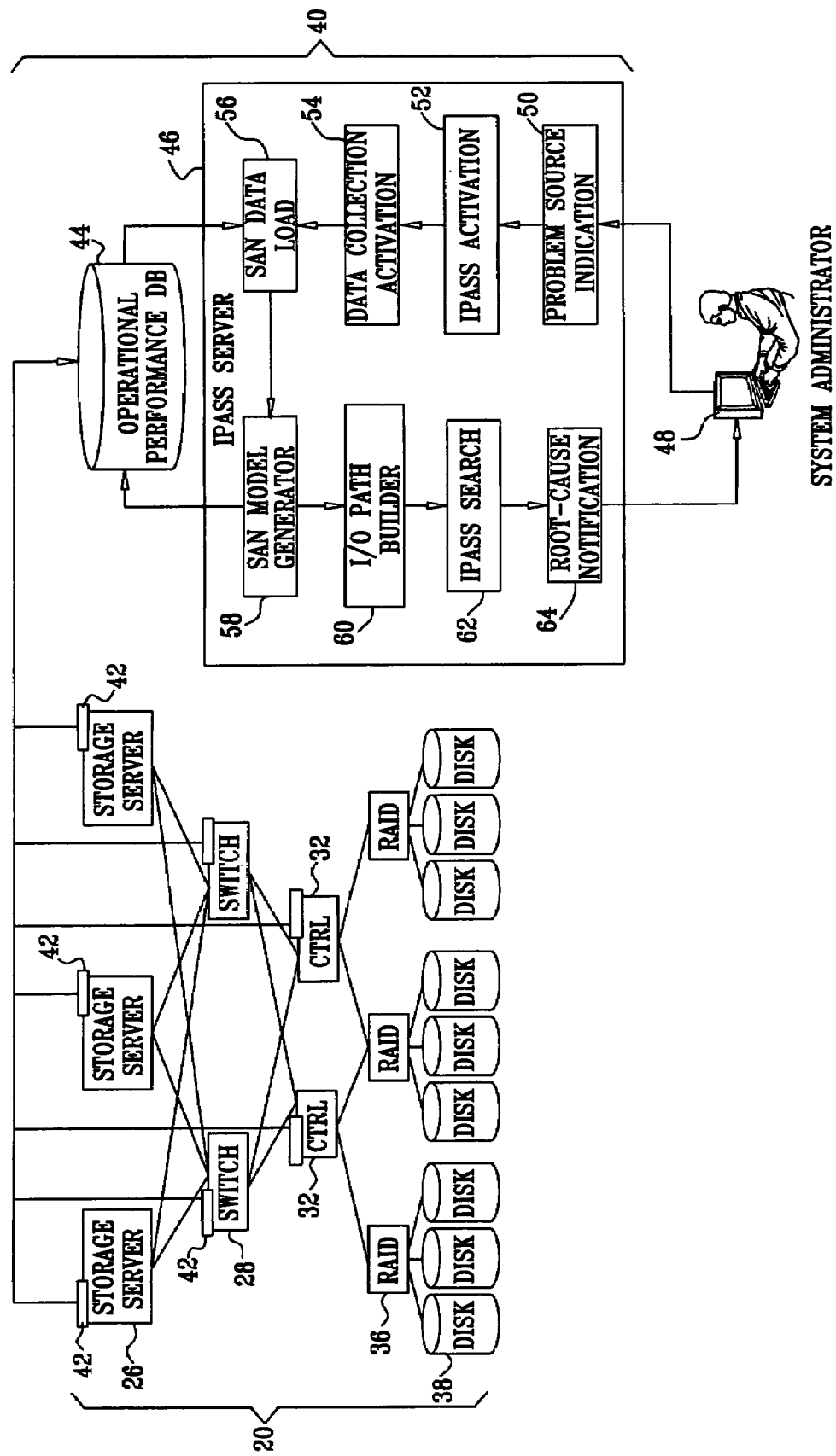
FIG. 2 is a block diagram that schematically shows functional details of a performance analyzer that is connected to a SAN, in accordance with an embodiment of the present invention.

FIG. 2 is a block diagram that schematically shows details of performance analyzer 40 and of the interaction of the performance analyzer with elements of SAN 20, in accordance with an embodiment of the present invention. To collect data regarding the performance of SAN 20, analyzer 40 uses monitoring agents 42 that are associated with the entities in the SAN. Agents 42 are typically implemented as software components, which run on servers 26, switches 28, disk controllers 32, etc. The agents periodically measure the performance of the entities with which they are associated and report the results to an operational performance database 44, which is stored in a suitable memory. Although the collection of performance metrics is commonly carried out by software agents, other collection methods may also be used and are considered to be within the scope of the present invention.

Agents 42 typically report on the performance of their corresponding network entities in terms of performance metrics, which reflect the operational variables of the corresponding entities. Typical performance metrics in a SAN include queue length, response time, throughput, capacity and utilization, inter alia. Problematic behavior of an entity in the SAN is reflected by deviant values of one or more of the performance metrics, e.g., values that fall outside predefined bounds (also referred to as thresholds) of normal behavior. These bounds are typically set heuristically, either by the system administrator or by automated statistical analysis of network performance under normal operating conditions. In embodiments of the present invention, any suitable performance bounds may be used for this purpose. The bounds may be fixed, or they may alternatively be updated dynamically during operation of SAN 20.

Database 44 also serves as a repository of configuration information regarding the physical and logical connections between the elements of SAN 20. This information may be input manually, or it may be determined by automatic management tools, such as the above-mentioned IBM TotalStorage Productivity Center for Fabric. (Further information regarding this product is available at www-306.ibm.com/software/tivoli/products/totalstorage-fabric/.)

An IPASS server 46 analyzes the data in database 44 in order to identify the problematic entities in SAN 20 that are likely to be the root cause of performance problems reported in the SAN. Server 46 uses an I/O path affine SAN search (IPASS) to locate these problematic entities, as described in detail hereinbelow. The search may be initiated automatically or by a system administrator, via a user interface on a user terminal 48.

FIG. 2 shows one possible functional realization of server 46, which combines the IPASS root cause search functions with automated SAN management activities. The blocks in this model typically correspond to software functions performed by the server. The system administrator inputs a problem source indication 50. The problem source is typically at the level of a storage consumer, such as a report by one or more of clients 22 that a response time of an I/O request is too long on a given logical volume of storage server 26, or that throughput via the logical volume is too slow. Alternatively, the problem source indication may be generated automatically when server 46 detects a pattern of performance faults in the performance metrics reported by agents 42. In response to the problem source indication, server 46 invokes IPASS activation 52 and data collection activation 54. Data collection may be activated on all the nodes of system 20, or only on a selected subset of the nodes. Alternatively, data collection may be operational at all times or may operate periodically, independently of any problem source indication. Similarly, IPASS activation 52 may be invoked even in the absence of a problem source indication to enable preemptive examination of consumer nodes and I/O paths in order to identify potential problems.

In response to activation 54, a data loader 56 loads topology and performance data from database 44. The topology data is used by a SAN model generator 58 to build a graph representing the topology of SAN 20. This graph may be periodically updated and stored in database 44 for subsequent use. Further aspects of this graph are described hereinbelow with reference to FIG. 3. An I/O path builder 60 traces I/O paths through the topology from the storage consumer to the storage providers that serve this consumer. An IPASS searcher 62 identifies the problematic entities along these paths. A root cause notification 64 reports the results of the search to the system administrator at terminal 48. The system administrator may then use the results in fixing the problem or, alternatively or additionally, may instruct server 46 to expand the search to other paths. The functions of the path builder and IPASS searcher are described in detail below with reference to FIG. 4.

Figure 3:
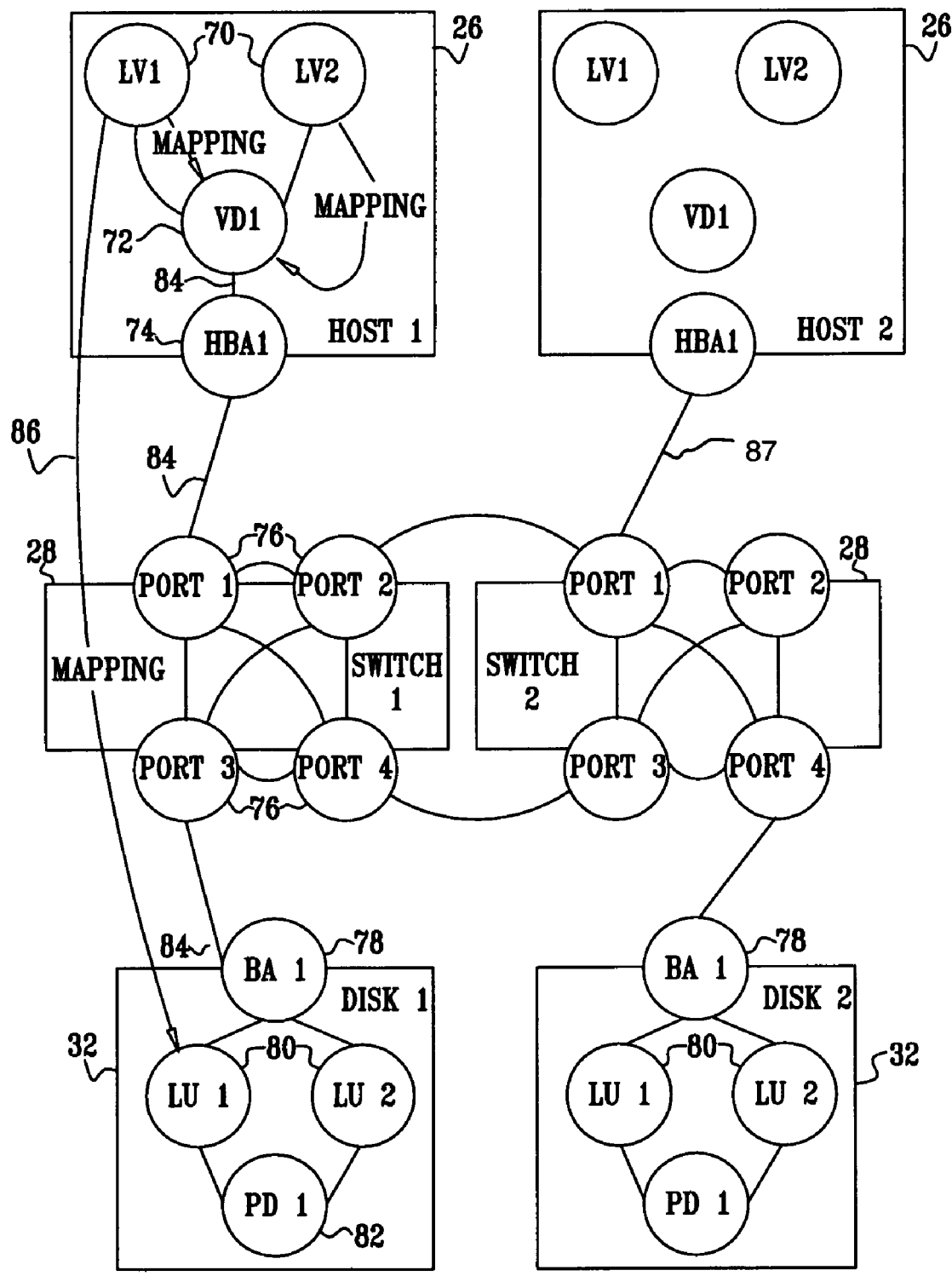
FIG. 3 is a graph representing I/O paths in a SAN, in accordance with an embodiment of the present invention.

FIG. 3 is a graph that schematically represents the topology of a SAN and I/O paths through the topology, in accordance with an embodiment of the present invention. The SAN model creates a pool of storage that can be shared by multiple consumers. This pool comprises logical units (LUs) 80, which use disk controllers 32, wherein each LU corresponds to physical blocks on one or more physical devices (PD) 82, such as disks 38. Thus, in the present embodiment, PDs 82 are referred to as the "providers" of the storage resources in SAN 20.

The storage pool provided by SAN 20 is presented to clients 22 as a set of logical volumes (LV) 70 on storage servers 26, which are also referred to as "hosts" (the storage servers are SAN hosts). For the purposes of this embodiment, LVs 70 are the "consumers" of the storage resources in the SAN. (Since clients 22 are located outside the SAN, and their contact with the SAN is at the application level, these clients are not considered as consumers in the context of the present model. Alternatively, the model may be expanded to reach these clients. The nodes between the providers and consumers are referred to as "mediators."

Potentially, any consumer of storage resources can be configured to access any LU by setting up mappings 86 between the LVs of the consumer hosts and the appropriate LUs of the providers. The mappings may include multiple levels of indirection and are typically administered using system and component configuration management tools. The mappings that are required for performance analysis are stored in the form of mapping tables, typically in database 44, or in operating system files. These mappings are used by IPASS server 46 in constructing the graph that represents the SAN configuration and the I/O paths within the graph.

Model generator 58 (FIG. 2) models SAN 20 as a graph SG=(V;E), wherein V is the set of nodes, and E is the set of edges 84. Each regular (atomic) node in the graph refers to either a physical (hardware) or a logical (software) atomic entity. The physical entities in the graph include, for example, a host bus adapter (HBA) 74, switch ports 76, bus adapters (BA) 78 of disk controllers 32, and physical devices 82. Logical entities in the graph include entities such as logical volumes 70, logical units 80 and virtual disks 72.

To view and operate on the graph with coarser granularity, the regular (atomic) nodes may be grouped together into super-nodes. Each super-node comprises a collection of other nodes and edges. Each switch 28, for instance, may be viewed as a super-node comprising the collection of its ports 76. The super-nodes serve to organize the regular nodes sharing the same properties (and the edges connecting these nodes) into a single logical entity. This use of super-nodes allows for coarser granularity of presentation and explicit modeling of relationships among the entities, without regard to the internal structure of the super-node. It also helps to speed up the navigation of the SAN graph.

Each edge in the graph SG represents a link connecting a pair of nodes or super-nodes. The link may represent a physical connection (such as a communication link) or a logical relationship (such as an address mapping) between the nodes. The address mappings recorded in the mapping tables in database 44, for example, are represented by the logical links between the nodes in the SAN graph. In contrast to the physical links, the logical links may connect nodes that are not directly connected in the physical topology of the SAN. Logical links are represented in the graph by directed edges. For example, the logical link between LV1 of HOST 1 and LU1 of the disk controller labeled DISK 1 in FIG. 3 represents address mapping 86 between the storage consumer and the provider.

The SAN logical topology usually imposes restrictions on graph SG, such as limitations on node access, in addition to the basic restrictions of the physical topology. For example, a RAID array may be physically connected to a switch that facilitates direct connections to multiple file servers. The RAID array itself, however, can typically be accessed by these servers through the Logical Volume Manager (LVM) on a host, and not directly. SAN model generator 58 therefore prunes the SAN graph to eliminate edges that correspond to physical connections that are prohibited by the logical topology. This pruning simplifies the tracing of I/O paths by path builder 60.

As another example, zoning is often used in SANs to provide protection and security for different applications. Zones partition the SAN into logical subnets that allow grouping of devices that can communicate and share information. Address mappings between consumers and providers of storage resources are typically allowed only between SAN entities belonging to the same zone. Model generator 58 uses zoning information in constructing the SAN graph, such that path builder 60 will trace paths only within the zone to which the consumer in question belongs.

Each node in graph SG has a vector R of attributes representing the resources of the node. For example, the resources of a disk controller typically include its storage capacity and its bandwidth, inter alia. With respect to each resource in R, the corresponding entity in the SAN may act as either a consumer, a provider or a mediator of that resource. Each resource has one or more associated performance metrics, which have values that can be measured directly by agents 42 based on the operation of the physical or logical entity to which the metric belongs. As noted earlier, exemplary performance metrics include queue length, throughput, capacity and utilization. Problematic nodes are characterized by one or more metrics that fall outside the predetermined bounds of normal operation.

Figure 4:
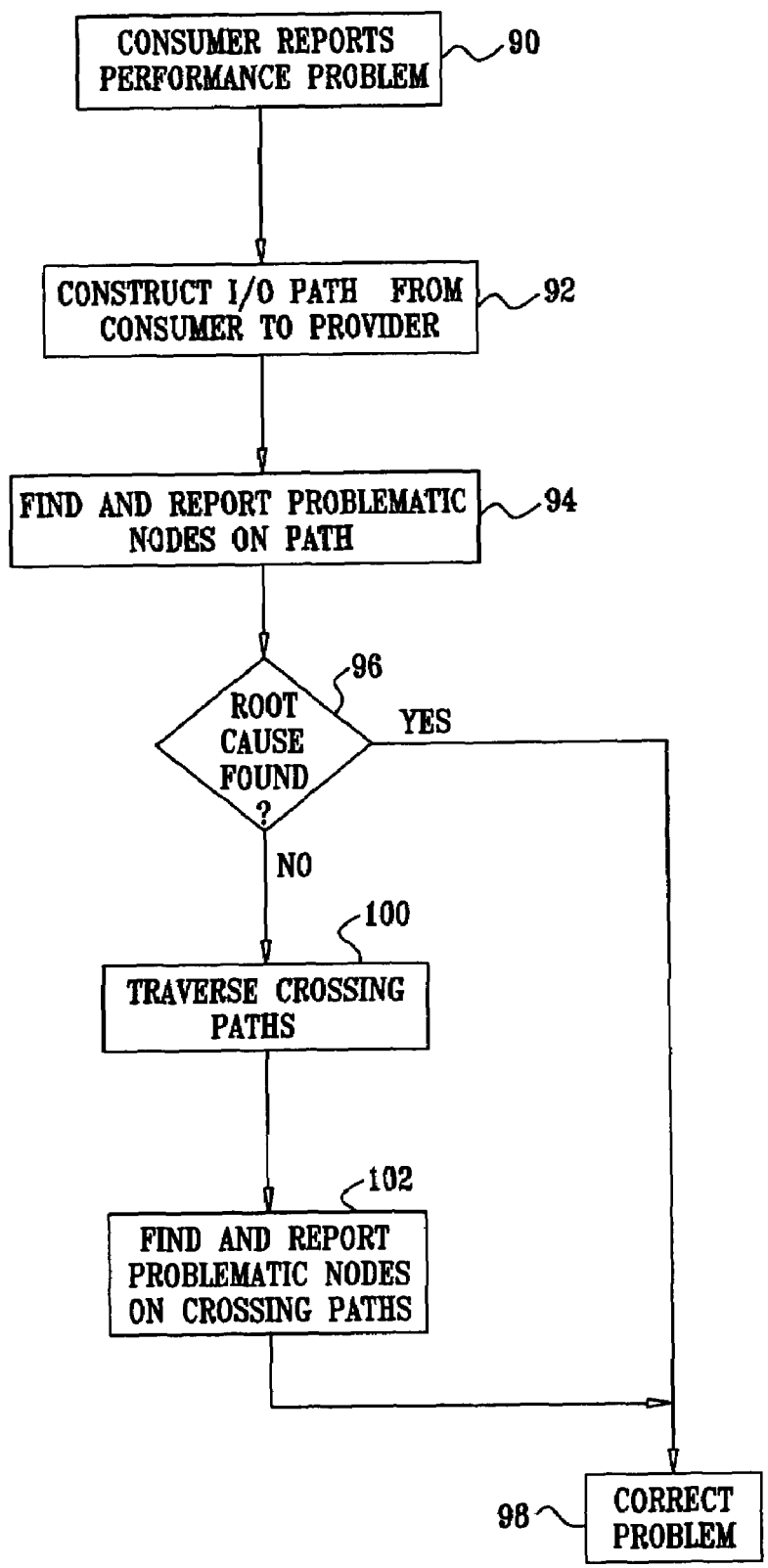
FIG. 4 is a flow chart that schematically illustrates a method for diagnosing performance problems in a SAN, in accordance with an embodiment of the present invention.

FIG. 4 is a flow chart that schematically illustrates a method performed by IPASS server 46 to diagnose performance problems in SAN 20, in accordance with an embodiment of the present invention. The method is typically initiated when a consumer C (for example, LV1 of HOST 1 in the graph of FIG. 3) reports a performance problem, at a problem reporting step 90. In response to this report—either received automatically or following a command entered via terminal 48—IPASS server 46 carries out an I/O path affine search through the SAN in order to identify problematic nodes on I/O paths that terminate on node C.

In the course of this search, path builder 60 constructs each of the candidate I/O paths, at a path construction step 92. The paths taken together have the form of a directed acyclic graph (DAG) within the overall SAN graph, emanating from a root at C to all the provider nodes P that serve C. For example, edges 84 that are marked in FIG. 3 show the DAG emanating from LV1 of HOST 1 to providers PD1 of DISK 1 and PD1 of DISK 2. Other edges in the graph, such as a link 87 from PORT 1 of SWITCH 2 to HBA1 of HOST 2, are eliminated from the DAG, since server 46 recognizes that these edges are not logically connected to C by a mapping in SAN 20. Path builder 60 typically matches physical links in the SAN configuration data with logical connections in the mapping tables by using the unique device IDs that are assigned to all the entities in the SAN and identify the devices in both the configuration data and mapping tables. Searcher 62 evaluates the performance metrics of the nodes along the paths in the DAG in order to identify the set of problematic nodes, PN, at a node finding step 94.

Although steps 92 and 94 are listed sequentially in FIG. 4, in practice these steps may be carried out in parallel. In other words, server 46 evaluates each new node that it adds to the DAG to determine whether the node is problematic. This procedure typically continues until the entire DAG has been constructed, and the performance metrics of all the nodes along the DAG have been evaluated. Alternatively, the search may terminate after a preset number of problematic nodes have been found, even if the DAG is not complete.

Optionally, server 46 computes a severity level for each problematic node identified at step 94, and may then sort and display the list of problematic nodes in order of severity. Typically, the severity level reflects the number of performance metrics at the node that are outside the preset bounds and the amount by which the metrics deviate from the bounds. For example, the severity level for any given node may be computed as a weighted sum of the percentage of deviation of all the relevant performance metrics at that node. Weighting may be based on history, for example, such that more recent data gets a weight larger than the weight of older data.

Table I below lists the method of steps 92 and 94 in pseudocode form, using an object-oriented style. The program in Table I assumes implicitly that all nodes that can be reached in the search belong to the same zone as C in the SAN. The scheme uses an informed depth-first search (DFS) with four colors: white, blue, gray and black. The method shown in the table constructs I/O paths that are, in fact, a sub-graph of the SAN graph. These paths form a collection of point-to-multipoint paths between consumers and providers of the storage resources. In the pseudocode, the point-to-multipoint paths are referred to as objects that have member functions and member variables.

Initially, all the nodes in the SAN graph are marked "white." When the search visits a given node, it marks the node "gray." When the branch of the search that is currently being explored encounters another gray node or a blue node, it is a sign that the branch has made a cycle. The cycle may belong to the path that will result from the search, but initially there is no way to determine unequivocally whether this is the case. Therefore, upon encountering a gray or blue node, the DFS backtracks. If all neighbors of a gray node have been explored, the color of the node changes to blue during the backtracking. Thus, a blue node indicates that the branch rooted at this node is fully explored, but its final status is still uncertain. A node is colored black when the DFS determines that the node belongs to an explored branch that terminates at the resource provider according to the mappings. Path construction step 92 terminates when all mappings are recursively explored.

The pseudocode in Table I includes the following functions:

paintBlackUpstream(node n) traverses and paints the point-to-multipoint objects starting from the node referred to by the argument and terminating at the root of the path. It paints black all the nodes it traverses.

addEntity(entity e) adds an entity (link or node) into the point-to-multipoint path object.

removeEntity(entity e) is the opposite of function addEntity(entity e).

removeBranch(entity e) removes all entities in the path, starting from the entity referred by the argument.

findProblematicEntitiesOnPath(paths pt) takes as an argument a paths object, and returns the subset of entities which violate thresholds on this path.

Since the implementation of these functions is intuitive, their specific implementation is not given in the pseudocode below.

TABLE I

I/O PATH CONSTRUCTION

```
SANGraph: a class representing the SAN (topology +
mappings).
Paths: a class representing a collection of point to
multipoint I/O paths
  1.    SANGraph SG: Initially, the color of each node in SG
is WHITE
  2.    P←∅: auxiliary set of nodes used for path
construction
  3.    N: the maximal number of problematic nodes to search
for
  4.    PN←∅: the set of problematic nodes found in Stage 1
  5.    Paths DAG←∅: I/O Paths that are constructed by the
algorithm in Stage 1
ipass1 (entryPoints, givenTargets) {
  6.           P←{entryPoints};
  7.    do {
  8.           cur ←removeFirst(P) //gets first element in the
internal order of P and removes it from the set
  9.           if (givenTargets == ∅)
 10.              targets ←SG.getMappingsFrom(cur).getTargets( );
 11.    else
 12.              targets ←givenTargets
```

TABLE I-continued

I/O PATH CONSTRUCTION

```
13.             paths ← buildIOPaths(cur, targets)
14.             DAG ← DAG ∪ {paths}
15.             if(paths.isNotEmpty( )) P ← path.getLeaves( )
16.         } while P≠∅
17.         PN ← findProblematicEntitiesOnPath(DAG)
18.         return PN}
Paths buildIOPaths(cur, targets) {
19.         foreach target ∈ targets do {
20.                         allocate new paths object pt
21.                         pt ← pt.recursivePath(cur, target, NULL) //NULL
signifies that the current entity has no previous node or
link in the paths object pt
22.                         if (pt.status == AFFIRMATIVE)
23.                                 return pt
24.             } //end foreach
25.     return empty paths
}
// AFFIRMATIVE: signifies that a target was found
// NEGATIVE: signifies that a target was not found in the
current branch
// UNCERTAIN: signifies that the status of the current
branch is not yet known
Paths recursivePath(start, dest, prev) {
26.                     this.status ← NEGATIVE;
27.                     if (start.type == NODE) {
28.                         switch (start.color) {
29.                             case WHITE:
30.                                 start.color ← GRAY
31.                                 break;
32.                             case BLUE:
33.                             case GRAY:
34.                                 this.status ← UNCERTAIN
35.                                 return pt
36.                             case BLACK:
37.                                 this.status ← AFFIRMATIVE
38.                                 return this
39.                         }
40.                     } //end if(start.type == NODE)
41.                     this.addEntity(start, prev) //adds start after
prev in the pt object
42.                     outLinks ← SG.computeOutLinks(start) //gets all
physical links of start (except prev, if it's a link)
43.                     foreach link ∈ outLinks do {
44.                         if (link.to == dest or link.from == dest) {
45.                             addEntity(link, start)
46.                             addEntity(dest, link)
47.                             this.paintBlackUpstream(dest) //Paint
black all entities on paths leading to dest
48.                             this.status ← AFFIRMATIVE
49.                             return this
50.                         }
51.                         peer ← link.to
52.                         this.addEntity(link, start);
53.                         if (peer ∈ this) {
54.                             use path pruning heuristics to
eliminate the search directions which are not promising.
See Table II for an example of such heuristics.
55.                         else {
56.                             this ←
this.recursivePath(peer,dest,link)
57.                             if (this.status == NEGATIVE)
58.                                 this.removeBranch(link)
59.                             else if (this.status == AFFIRMATIVE)
60.                                 peer.color ← BLACK
61.
62.                         }// if (peer ∈ this)
63.                         else if (peer.color == BLACK)
64.                             this.status ← AFFIRMATIVE
65.                     }//foreach
66.                     if (start.color == GRAY)
                            if (this.status == NEGATIVE
                                or this.status ==
                        UNCERTAIN)
67.                             start.color ← BLUE
68.
69.                     return this
}
```

TABLE I-continued

I/O PATH CONSTRUCTION

```
computeOutLinks(node nd) {
70.     resultList ← ∅
71.     foreach neighbor n of nd in SG do
72.         if a physical link l=(nd,n) exists
73.             resultList.add(l)
74.         mappings ← nd.getMappings( )
75.
76.     resultList ← resultList ∩ mappings
77.     return resultList
}
```

Table II below gives an example of a heuristic method that may be used to prune unnecessary search directions at step 92. In common SAN topologies, some entities may have dual roles. For example, a logical device at a host acts as a consumer of storage from the disk controllers and also as a mediator between the application consuming the storage and the disk controller that provides it. Some paths may therefore be irrelevant for SAN management, such as paths that connect consumers to consumers or providers to providers. Therefore, the IPASS path builder may use heuristics, such as those shown in Table II, to exclude these irrelevant branches.

TABLE II

EXAMPLE OF PATH PRUNING HEURISTICS

```
Variables peer, start, pt, and link are same as in
recursivePath(.), Table I.
1. if (peer.isConsumer( ) and
                    !peer.isMediator( )
               and
                    !peer.isProvider( ) or
                    (peer.isProvi
                    der( ) and
                    start.isProvi
                    der( )))
2. pt.removeEntity(link)//this direction is not promising
```

Returning now to FIG. 4, at the conclusion of step 94, server 46 outputs the set of problematic nodes on the DAG to the system administrator via terminal 48. The system administrator reviews these results, at a review step 96. Alternatively or additionally, the results may be analyzed by an automated analysis tool. If the system administrator (or automated tool) determines that one of the problematic nodes appears to be the root cause of the performance problem reported by the consumer, appropriate corrective action may be initiated, at a problem corrections step 98. Typically, the corrective action comprises replacing or reconfiguring the problematic entity in SAN 20.

Alternatively, the system administrator (or automated tool) may determine that none of the problematic nodes reported at step 94 is itself the root cause of the performance problem at hand. In this case, the search may be expanded, at a crossing path checking step 100. At this step, server 46 checks other I/O paths in SAN 20 that cross the paths in the DAG found at step 92. Typically, the server checks the paths that cross the original DAG at nodes that were previously identified as problematic. Thus, for example, if BA1 of DISK 2 was identified as a problematic node on a path from LV1 of HOST 1 to LU2 of DISK 2 at step 94, server 46 may check the crossing path from HOST 2 via BA1 of DISK 2 to LU1 of DISK 2 at step 100. The rationale for checking the crossing path is that problems originating on the crossing path are likely to affect the performance of the node at which the paths cross. Thus, in the present example, if an application served by HOST 2 is creating an excessive load on LU1, the performance of BA1 may suffer as a result, so that throughput to and from LU2 is compromised.

Server 46 finds and reports the problematic nodes located on the crossing paths, at a crossing path reporting step 102. As in the first stage of the search, steps 100 and 102 are typically carried out simultaneously.

Table III is a pseudocode listing of the method of steps 100 and 102. The method begins from the set of problematic nodes found at step 94, which are now labeled PN1, and searches the crossing paths to find additional problematic nodes PN2. The same simplifying assumptions are used here as in the listing in Table I.

TABLE III

CROSSING PATH CONSTRUCTION

```
ipass2(SAN topology, problematic nodes) {
1.      //variables of stage 1 are available for use in
        //stage 2
        2. SG ← SAN topology
3.      PN1 ← problematic nodes:the set of problematic nodes
found at Stage 1 (ipass1(.))
4.      PN2 ← ∅:the set of problematic nodes found at Stage 2
5.      consumers: all consumer nodes in the zone
6.
7.      foreach c ∈ consumers do {
8.          paths ← buildIOpaths(c, PN1)
9.          PN2 ← PN2 ∪ findProblematicEntitiesOnPath(paths)
10.         targets ← c.getMappings( ).getTargets( )
11.         midpoints ← paths.getLeaves( )
12.         PN2 ← PN2 ∪ ipass1(midpoints, targets)
13.     }//end foreach
14.     return PN2
}
```

Certain changes may be made in the simplified code of Table III in order to make this stage run more efficiently. For example, for the sake of efficiency, the search may start at the problematic nodes that had the highest severity level and may be limited to traversing no more than a preset number of crossing paths. The method may also be modified to identify and eliminate crossing paths that overlap one another.

Additionally or alternatively, before searching for problematic nodes on the crossing paths, server 46 may first check the nodes that are immediate neighbors of the problematic nodes identified at step 94, or all the nodes that are within a certain distance of the problematic nodes. The server goes on to build the complete crossing paths only if none of these neighbors is found to be the root cause of the performance problem.

The selection of neighboring nodes to check may be further refined based on a priori knowledge of dependencies of the problematic nodes on other nodes in the SAN. For instance, it might be found (based on history listings) that whenever disk controller 1 has a long request queue, so does disk controller 2. This fact may be used in node selection even if the reasons for the dependency are unknown. One source of knowledge about dependencies may be previous runs through the method of FIG. 4, in which it was discovered that a problem at one node was caused by the behavior of a certain other node. Another source of knowledge might be the physical proximity of certain nodes, so that heat produced by one node affects the other.

As another option, in small SANs it might be feasible and desirable, to compute DAGs of I/O paths in advance. In large SANs, precomputing all DAGs may be infeasible. If, however, there are parts of the SAN in which I/O traffic is heavier, and the risk of performance problems is higher, it might be useful to compute a small subset of DAGs relevant to that part of the SAN in order to avoid recomputation.

Although the exemplary embodiments described above relate to a specific sort of SAN configuration, the methods used in these embodiments may be applied, as well, to storage networks having other configurations, such as a SAN in which hosts access storage resources directly. Furthermore, the principles of the present invention are applicable, mutatis mutandis, to finding the root cause of problems in other network-based systems, such as server farms used as application servers and multi-processor computing systems.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for diagnosing network performance problems, the method comprising:
  providing a graph representing a topology of a network comprising first nodes that are classified as providers of a resource, second nodes that are classified as consumers of the resource, and third nodes that are classified as mediators intervening between the providers and the consumers;
  receiving a report of a performance problem encountered by a given consumer in the network;
  responsively to the report, tracing at least one input/output (I/O) path through the graph connecting the given consumer to one or more of the providers;
  identifying one or more problematic nodes along the at least one I/O path as possible causes of the performance problem;
  tracing a further I/O path through the graph connecting another consumer to the providers and crossing the at least one I/O path at one of the problematic nodes after identifying one or more problematic nodes along the at least one I/O path; and
  identifying one or more further problematic nodes along the further I/O path as a possible cause of the performance problem,
  wherein providing the graph comprises identifying physical and logical links between the nodes, and
  wherein tracing the at least one I/O path comprises building the at least one I/O path in accordance with the logical links.

2. The method according to claim 1, wherein identifying the logical links comprises providing a logical mapping between the nodes, and wherein building the at least one I/O path comprises eliminating from the path the physical links that do not correspond to the logical mapping.

3. The method according to claim 1, wherein providing the graph comprises grouping a plurality of the nodes together into a super-node having an internal node structure, and wherein tracing the at least one I/O path comprises tracing the at least one I/O path through the super-node without reference to the internal node structure.

4. The method according to claim 1, wherein the first nodes comprises a storage area network (SAN), and wherein the resource comprises at least one of a storage capacity and a bandwidth.

5. The method according to claim 4, wherein the first nodes comprise storage servers having logical volumes associated therewith, and wherein receiving the report comprises receiving an indication of at least one of a capacity problem and a throughput problem in one of the logical volumes.

6. The method according to claim 4, wherein the first nodes comprise storage servers having logical volumes associated therewith, and wherein the second nodes comprise storage devices having logical units associated therewith, and wherein tracing the at least one I/O path comprises extending the at least one I/O path from one of the logical volumes to one or more of the logical units.

7. The method according to claim 1, wherein tracing the at least one I/O path comprises building a directed acyclic graph (DAG) within the topology of the network from the given consumer to the providers that are coupled by the topology to provide the resource to the given consumer.

8. The method according to claim 1, wherein identifying the one or more problematic nodes comprises monitoring performance metrics of the nodes in the network, and identifying a given node as problematic if one or more of the performance metrics of the given node are outside a predefined bound.

9. The method according to claim 1, wherein tracing the further I/O path comprises initiating the tracing of the further I/O path upon determining that the one or more problematic nodes identified along the at least one I/O path are not the causes of the performance problem.

* * * * *